(12) United States Patent
Lastra (10) Patent No.: US 10,100,600 B2
(45) Date of Patent: Oct. 16, 2018

(54) EXPANDABLE TOOLS USING SEGMENTED CYLINDRICAL SECTIONS

(71) Applicant: Saudi Arabian Oil Company, Dhahran (SA)

(72) Inventor: Rafael Adolfo Lastra, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 137 days.

(21) Appl. No.: 15/014,410

(22) Filed: Feb. 3, 2016

(65) Prior Publication Data

US 2016/0230496 A1 Aug. 11, 2016

Related U.S. Application Data

(60) Provisional application No. 62/114,263, filed on Feb. 10, 2015.

(51) Int. Cl.
  *E21B 23/01* (2006.01)
  *E21B 33/124* (2006.01)
  (Continued)

(52) U.S. Cl.
  CPC .......... *E21B 33/128* (2013.01); *E21B 23/01* (2013.01); *E21B 33/124* (2013.01);
  (Continued)

(58) Field of Classification Search
  CPC .... E21B 23/01; E21B 33/1208; E21B 33/124; E21B 33/128; E21B 43/105
  See application file for complete search history.

(56) References Cited

U.S. PATENT DOCUMENTS

| | | | | |
|---|---|---|---|---|
| 2,780,294 A | * | 2/1957 | Loomis | E21B 33/1208 277/339 |
| 4,754,543 A | * | 7/1988 | Spivy | B26D 3/16 279/2.1 |

(Continued)

FOREIGN PATENT DOCUMENTS

| | | |
|---|---|---|
| EP | 0265341 | 4/1988 |
| EP | 1719873 A1 | 11/2006 |

(Continued)

OTHER PUBLICATIONS

International Search Report and Written Opinion for related PCT application PCT/US2016/017098 dated May 31, 2016.

*Primary Examiner* — Matthew R Buck
(74) *Attorney, Agent, or Firm* — Bracewell LLP; Constance G. Rhebergen; Linda L. Morgan (57) ABSTRACT

An expandable tool can be lowered in a contracted state into a subterranean well. The expandable tool includes a tool frame that is movable between a frame contracted position and a frame extended position, and a plurality of tool segments. The plurality of tool segments include a plurality of moveable tool segments and a plurality of stationary tool segments. An outer diameter of the expandable tool can be increased by moving each of the tool segments radially outward. The expandable tool can be rotated so that the plurality of moveable tool segments rotate relative to the tool frame and the plurality of stationary tool segments remain fixed relative to the tool frame. Applying axial force to the expandable tool will move moveable tool segments axially relative to the tool frame, and an axial length of the expandable tool is reduced until the expandable tool is in a final state.

20 Claims, 6 Drawing Sheets

(51) Int. Cl.
*E21B 33/128* (2006.01)
*E21B 43/10* (2006.01)
*E21B 33/12* (2006.01)
*F16L 9/22* (2006.01)

(52) U.S. Cl.
CPC ........ E21B 33/1208 (2013.01); E21B 43/105 (2013.01); *F16L 9/22* (2013.01)

(56) References Cited

U.S. PATENT DOCUMENTS

| | | | |
|---|---|---|---|
| 5,340,626 A | 8/1994 | Head | |
| 5,901,789 A | 5/1999 | Donnelly et al. | |
| 6,250,385 B1 * | 6/2001 | Montaron | E21B 43/086 |
| | | | 166/207 |
| 6,296,054 B1 | 10/2001 | Kunz et al. | |
| 7,114,559 B2 * | 10/2006 | Sonnier | E21B 4/18 |
| | | | 166/206 |
| 7,380,595 B2 * | 6/2008 | Wetzel | E21B 43/105 |
| | | | 166/207 |
| 8,069,916 B2 * | 12/2011 | Giroux | E21B 7/20 |
| | | | 166/212 |
| 8,230,913 B2 | 7/2012 | Hart et al. | |
| 8,627,885 B2 * | 1/2014 | Adam | E21B 43/105 |
| | | | 166/206 |
| 8,800,650 B2 * | 8/2014 | Spray | E21B 17/00 |
| | | | 166/207 |
| 9,085,967 B2 * | 7/2015 | Bennett | E21B 43/105 |
| 2004/0194969 A1 | 10/2004 | Hiorth et al. | |
| 2006/0180318 A1 | 8/2006 | Doering et al. | |
| 2007/0131413 A1 * | 6/2007 | Millet | E21B 33/1216 |
| | | | 166/115 |
| 2011/0048744 A1 | 3/2011 | Conner et al. | |
| 2011/0073310 A1 | 3/2011 | Clemens et al. | |
| 2013/0190558 A1 | 7/2013 | Alexander et al. | |

FOREIGN PATENT DOCUMENTS

| | | |
|---|---|---|
| EP | 1242714 B1 | 6/2012 |
| WO | 03008760 A1 | 1/2003 |
| WO | 2014007843 A1 | 1/2014 |
| WO | 2014177886 A2 | 11/2014 |

* cited by examiner

EXPANDABLE TOOLS USING SEGMENTED CYLINDRICAL SECTIONS

CROSS REFERENCE TO RELATED APPLICATIONS

This application claims priority to and the benefit of U.S. Provisional Application No. 62/114,263, titled "Expandable Tools Using Segmented Cylindrical Sections," filed Feb. 10, 2015, the full disclosure of which is hereby incorporated by reference herein in its entirety.

BACKGROUND OF THE DISCLOSURE

1. Field of the Disclosure

The present technology relates to hydrocarbon production operations. In particular, the present technology relates to expandable tools for use in a subterranean well.

2. Description of the Related Art

Some downhole tools are required to be lowered into a subterranean well through a region of reduced diameter, and then to have the ability to expand in diameter once the final location of the tool within the well has been reached. In its final state, it can be desirable for the tool to have a bore with an inner diameter that will allow for other operations within the well to continue to proceed through the downhole tool, or to maximize the flow of production fluids through the tool.

As an example, in some wells straddle packers are used to shut off zones from producing or for creating injection intervals above or below the packers. A straddle assembly can have two packers connected to each other in a manner that isolates the section between these two packers from the zones above and below the assembly. A larger inner diameter in a straddle packer provides less resistance to flow, creating less of a downhole choke. Also, a larger inner diameter in a straddle packer allows for the running of well servicing tools below the packers for operations such as perforating, logging, or plugging back.

SUMMARY OF THE DISCLOSURE

Embodiments of the present disclosure provide systems and methods utilizing specially shaped tool segments that allow expansion of the diameter of the tools and setting of the tools using basic rotation, expansion and compression operations. The use of tool segments that form cylindrical sections allows the construction of expandable tools that can reduce its outside diameter to a suitable size to deploy through small diameter tubing and also allows for expansion to a bigger size diameter once it has reached the required depth. The range of expansion and contraction of embodiments of this disclosure is wider than some existing technologies and embodiments of this disclosure provide greater structural stability than some existing technologies.

In an embodiment of this disclosure, a method for deploying an expandable tool in a subterranean well includes lowering the expandable tool in a contracted state into the subterranean well. The expandable tool includes a tool frame located at a frame end of the expandable tool that is movable between a frame contracted position and a frame extended position, and a plurality of tool segments spaced around a central axis of the expandable tool. The plurality of tool segments include a plurality of moveable tool segments and a plurality of stationary tool segments. An outer diameter of the expandable tool is increased by moving each of the tool segments radially outward, until the expandable tool is in an expanded state. The expandable tool is rotated so that the plurality of moveable tool segments rotate relative to the tool frame and the plurality of stationary tool segments remain fixed relative to the tool frame, until the expandable tool is in a fully rotated state. An axial force is applied to the expandable tool so that the moveable tool segments move axially relative to the tool frame and an axial length of the expandable tool is reduced, until the expandable tool is in a final state.

In alternate embodiments, an inner diameter of the expandable tool in the final state can be at least as large as the outer diameter of the expandable tool in the contracted state. In the contracted state the plurality of moveable tool segments can be axially aligned with the plurality of stationary tool segments. In the final state the plurality of moveable tool segments can be circumferentially aligned with the plurality of stationary tool segments. Each of the plurality of stationary tool segments can be fastened to the tool frame and each of the plurality of moveable tool segments are moveably linked to at least one of the plurality of stationary tool segments. The step of applying an axial force to the expandable tool can include sealingly engaging each of the plurality of tool segments with a circumferentially adjacent one of the plurality of tool segments.

In other alternate embodiments, each of the plurality of moveable tool segments can include a radially outer layer, a radially inner layer, and a middle layer located between the radially outer layer and the radially inner layer. The middle layer can be axially and circumferentially offset from each of the radially outer layer and the radially inner layer, defining an end pocket and an end lip opposite the end pocket, and further defining a side pocket and a side lip opposite the side pocket. In the final state, the side lip of each of the plurality of tool segments can be located within a side pocket of a circumferentially adjacent one of the plurality of tool segments. The step of applying an axial force to the expandable tool can include sliding the side lip of each of the plurality of tool segments within a side pocket of a circumferentially adjacent one of the plurality of tool segments. In the contracted state, the end lip of certain of the plurality of tool segments can be located within an end pocket of an axially adjacent one of the plurality of tool segments. The step of rotating the expandable tool can include sliding the end lip of certain of the plurality of tool segments within the end pocket of an axially adjacent one of the plurality of tool segments.

In an alternate embodiment of the current disclosure, a method for deploying an expandable tool in a subterranean well includes lowering the expandable tool in a contracted state into the subterranean well. The expandable tool includes a tool frame located at a frame end of the expandable tool that is movable between a frame contracted position and a frame extended position, and a plurality of tool segments spaced around a central axis of the expandable tool. The plurality of tool segments include a plurality of moveable tool segments and a plurality of stationary tool segments that are fixed to the tool frame. An outer diameter of the expandable tool can be expanded by moving a plurality of segments sets radially outward and moving the tool frame from the contracted position to the extended position, until the expandable tool is in an expanded state. Each segment set includes at least one of the plurality of moveable tool segments and one of the plurality of stationary tool segments. The expandable tool is rotated so that the at least one moveable tool segment of each segment set rotates relative to the stationary tool segment of such segment set, until the expandable tool is in a fully rotated state.

An axial force can be applied to the expandable tool so that the moveable tool segments move axially relative to the tool frame and an axial length of the expandable tool is reduced, until the expandable tool is in a final state.

In alternate embodiments, the step of increasing an outer diameter of the expandable tool can include increasing the outer diameter of the expandable tool until the inner diameter of the expandable tool in the final state is at least as large as the outer diameter of the expandable tool in the contracted state. The step of applying an axial force to the expandable tool can include sealingly engaging each of the plurality of tool segments with a circumferentially adjacent one of the plurality of tool segments. When the expandable tool is in the contracted state the at least one of the plurality of moveable tool segments of each segment set can be axially aligned with the one of the plurality of stationary tool segments of such segment set. When the expandable tool is in the final state, the at least one of the plurality of moveable tool segments of each segment set can be circumferentially aligned with the one of the plurality of stationary tool segments of such segment set.

In another alternate embodiment of this disclosure, an expandable tool for use in a subterranean well includes a tool frame located at a frame end of the expandable tool that is movable between a frame contracted position and a frame extended position. The expandable tool further includes a plurality of tool segments spaced around a central axis of the expandable tool. The plurality of tool segments include a plurality of moveable tool segments and a plurality of stationary tool segments, the plurality of moveable tool segments being moveable between a contracted state, an expanded state, a fully rotated state, and a final state. A free end opposite the frame end of the expandable tool is rotatable relative to the tool frame to rotate the plurality of moveable tool segments relative to the tool frame until the expandable tool is in the fully rotated state while the plurality of stationary tool segments remain fixed relative to the tool frame. The free end is further moveable in response to an axial force to move the moveable tool segments axially relative to the tool frame until the expandable tool is in the final state.

In alternate embodiments an inner diameter of the expandable tool in the final state can be at least as large as an outer diameter of the expandable tool in the contracted state. In the contracted state the plurality of moveable tool segments can be axially aligned with the plurality of stationary tool segments. In the final state the plurality of moveable tool segments can be circumferentially aligned with the plurality of stationary tool segments. Each of the plurality of moveable tool segments can be moveably linked to at least one of the plurality of stationary tool segments.

BRIEF DESCRIPTION OF THE DRAWINGS

So that the manner in which the above-recited features, aspects and advantages of the embodiments of this disclosure, as well as others that will become apparent, are attained and can be understood in detail, a more particular description of the systems and methods briefly summarized above may be had by reference to the embodiments thereof that are illustrated in the drawings that form a part of this specification. It is to be noted, however, that the appended drawings illustrate only preferred embodiments of the disclosure and are, therefore, not to be considered limiting of the disclosure's scope, for the disclosure may admit to other equally effective embodiments.

DETAILED DESCRIPTION OF THE PREFERRED EMBODIMENTS

The Specification, which includes the Summary of Disclosure, Brief Description of the Drawings and the Detailed Description of the Preferred Embodiments, and the appended Claims refer to particular features (including process or method steps) of the embodiments of this disclosure. Those of skill in the art understand that the disclosure includes all possible combinations and uses of particular features described in the Specification. Those of skill in the art understand that the disclosure is not limited to or by the description of embodiments given in the Specification. The inventive subject matter is not restricted except only in the spirit of the Specification and appended Claims.

Those of skill in the art also understand that the terminology used for describing particular embodiments does not limit the scope or breadth of the disclosure. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this disclosure belongs unless defined otherwise.

As used in the Specification and appended Claims, the singular forms "a", "an", and "the" include plural references unless the context clearly indicates otherwise. As used, the words "comprise," "has," "includes", and all other grammatical variations are each intended to have an open, non-limiting meaning that does not exclude additional elements, components or steps. Embodiments of the present disclosure may suitably "comprise", "consist" or "consist essentially of" the limiting features disclosed, and may be practiced in the absence of a limiting feature not disclosed. For example, it can be recognized by those skilled in the art that certain steps can be combined into a single step.

Spatial terms describe the relative position of an object or a group of objects relative to another object or group of objects. The spatial relationships apply along vertical and horizontal axes. Orientation and relational words including "uphole" and "downhole"; "above" and "below" and other like terms are for descriptive convenience and are not limiting unless otherwise indicated.

Where the Specification or the appended Claims provide a range of values, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the Specification and appended Claims to a method comprising two or more defined steps, the defined steps can be carried out in any order or simultaneously except where the context excludes that possibility.

Figure 1:
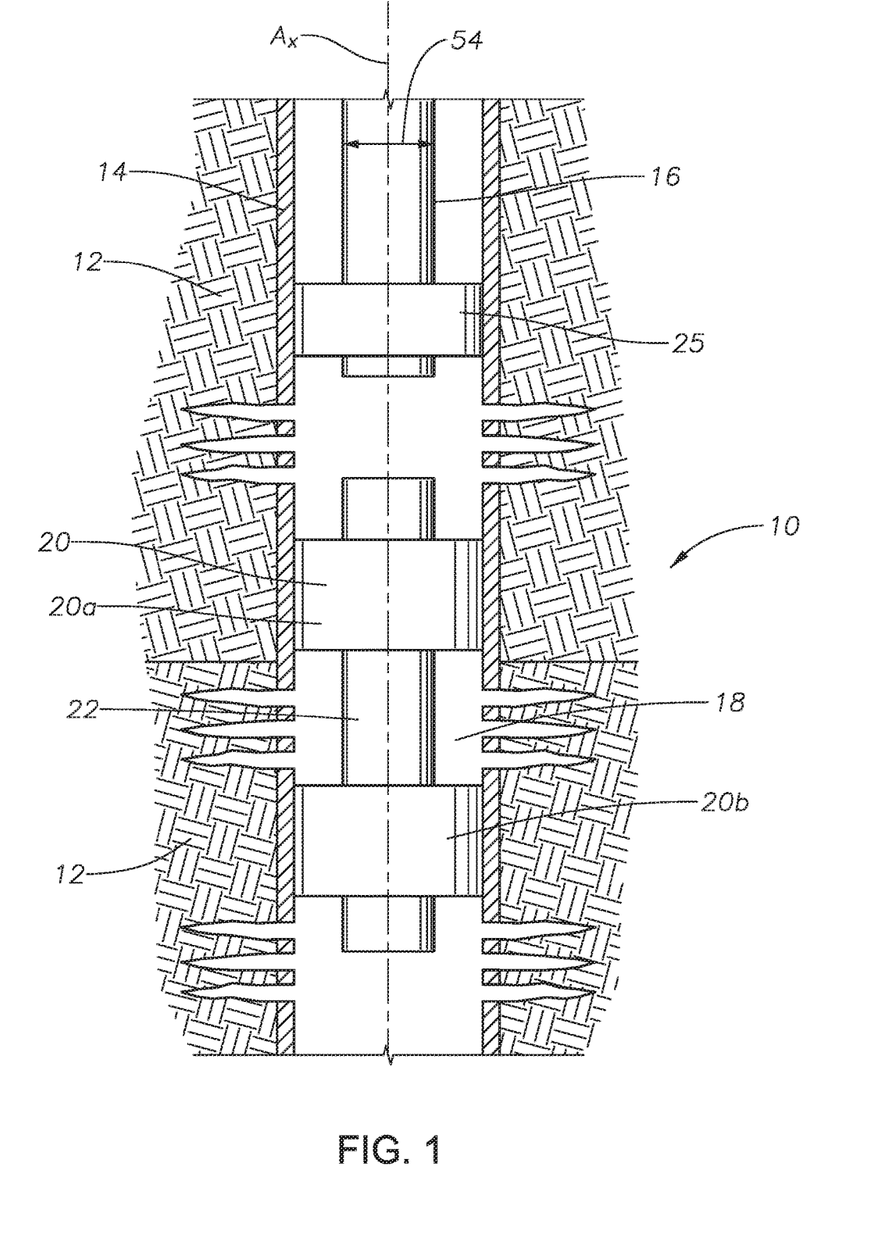
FIG. 1 is a schematic partial section view of a portion of a subterranean well having an expandable tool in accordance with an embodiment with this disclosure.

Looking at FIG. 1, subterranean well 10 can extend through a number of producing zones 12, such as zones that produce hydrocarbons. Surface casing 14 of subterranean well 10 can be perforated so that production fluids, such as oil or gas, can be produced to the surface through a production casing or tubing 16. During the life of the subterranean well, there maybe times when a portion of the subterranean well 10 needs to be segregated to form an isolated region 18, such as, for example, when isolated region 18 of the subterranean well 10 is producing unwanted water. Alternately, isolated region 18 may be segregated because it has been selected for an injection treatment that would be undesirable to comingle with production fluids.

As will be described in this disclosure, expandable tool 20 can be deployed to act as a straddle packer. In the example embodiment of FIG. 1, a first expandable tool 20a is deployed at an upper end of isolated region 18 and a second expandable tool 20b is deployed at a lower end of isolated region 18. Packer tubing 22 can extend from above first expandable tool 20a to below second expandable tool 20b so that production of hydrocarbons can continue from producing zones 12 above first expandable tool 20a and from producing zones 12 below second expandable tool 20b. Meanwhile, the fluids of isolated region 18, whether it be water, treatment chemicals, or other fluids, will be excluded from the fluids that are produced to the surface through tubing 16. A standard packer 25 located proximate to a lower end of tubing 16 can ensure that produced fluids travel towards the surface through tubing 16 and not by way of the annulus defined between the outer diameter of tubing 16 and the inner diameter of surface casing 14. Surface casing 14, tubing 16, and expandable tool 20 can be located concentrically, or collinearly, as applicable, about central axis Ax.

Figure 2:
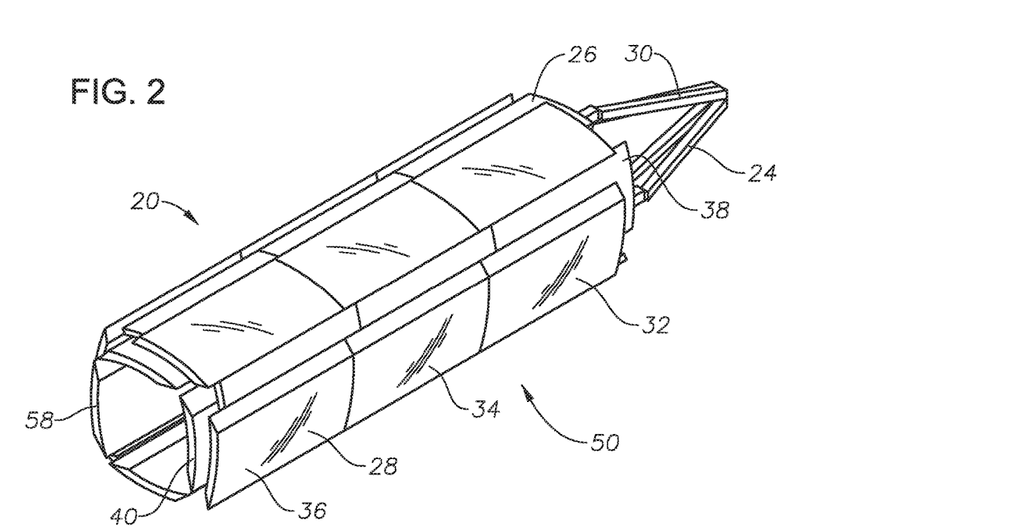
FIG. 2 is a perspective view of an expandable tool in accordance with an embodiment with this disclosure, shown in a contracted state.

Turning now to FIG. 2, expandable tool 20 is shown in a contracted state. Expandable tool 20 includes tool frame 24. Tool frame 24 is located at frame end 26 of expandable tool 20 and is movable between a frame contracted position (FIGS. 2 and 8) and a frame extended position (FIGS. 3-7 and 9). When expandable tool 20 is in the contracted state of FIG. 2, tool frame 24 is in the frame contracted position. Tool frame 24 can be formed of jointed elongated members that are connected to a plurality of tool segments 28. Tool segments 28 are shaped to interlock and allow relative axial and longitudinal displacement between them, while at the same time provide sealing surfaces between tool segments 28 when expandable tool 20 is in a final state. Frame 24 can be used to expand and contract expandable tool 20 and to support tool segments 28. The elements of frame 24 may not deform between the expanded and contracted portion, but instead change position relative to each other.

In the example embodiment of FIG. 2, tool frame 24 includes four legs 30. Each leg 30 is pivotally connected to each other leg 30 at a first end of leg 30, and connected to a tool segment 28 at an opposite second end of leg 30. Each leg 30 has a rotating joint proximate to the attachment point with tool segment 28. When in the frame contracted position, legs 30 are angled relative to each other about their common attachment point. When in the frame extended position (FIG. 3), legs 30 can extend from their common attachment point in the same plane, or can be at a lesser angle relative to each other than when they are in the frame contracted position.

In alternate embodiments, tool frame 24 could include a piston system, telescopic members, or other types of framework that allows the expandable tool 20 to move between a frame contracted position (FIGS. 2 and 8) and a frame extended position (FIGS. 3-7 and 9).

Tool segments 28 to which tool frame 24 are attached are stationary tool segments 32. Stationary tool segments 32 are fixed to the second end of one of the legs 30 so that stationary tool segments 32 do not rotate or move axially relative to the second end of leg 30 to which such stationary tool segment 32 is attached. The other tool segments 28 are moveable tool segments 34. Moveable tool segments 34 can move axially and circumferentially relative to other tool segments 28 and relative to the second end of one of the legs 30. In this manner, each of the plurality of stationary tool segments 32 are fastened to tool frame 24 and each of the plurality of moveable tool segments 34 are moveably linked to at least one of the plurality of stationary tool segments 32. Tool segments 28 may not deform as frame 24 moves between the expanded and contracted portion, but instead tool segment 28 change position relative to each other.

Figure 8:
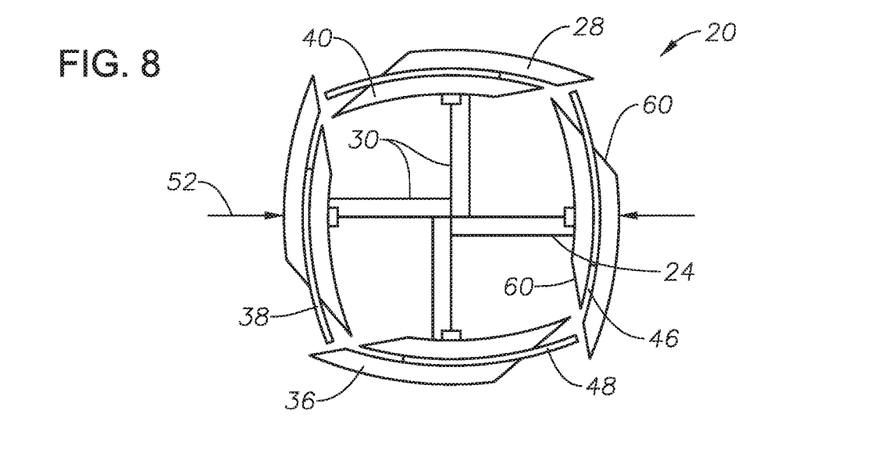
FIG. 8 is a section view of the expandable tool of FIG. 2, shown in the contracted state.
Figure 9:
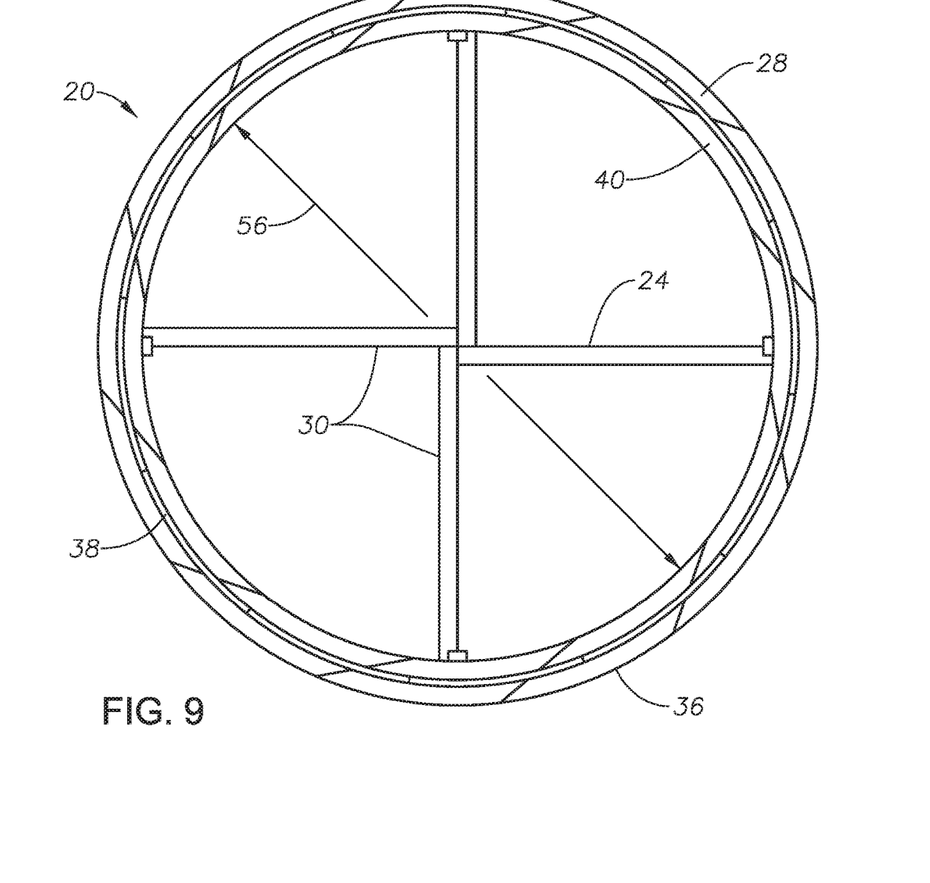
FIG. 9 is a section view of the expandable tool of FIG. 2, shown in the final state.
Figure 10:
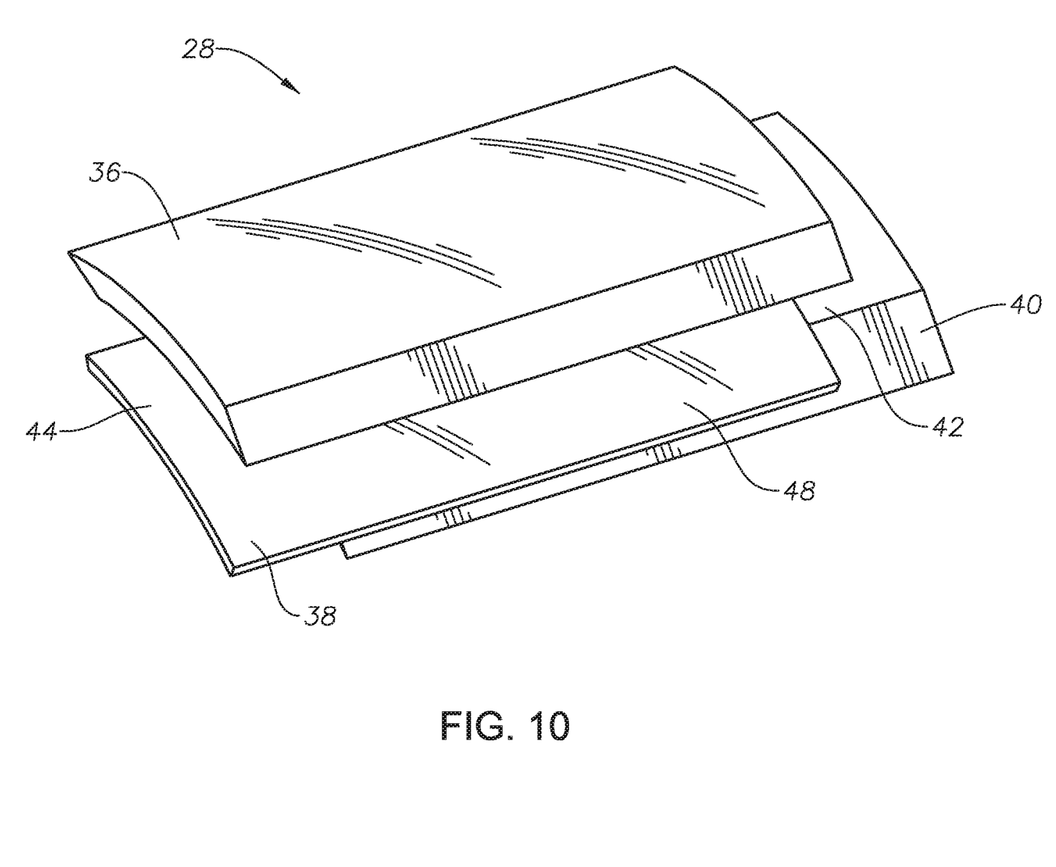
FIG. 10 is a perspective view of a tool segment of an expandable tool in accordance with an embodiment with this disclosure.

Turning now to FIG. 10, tool segment 28 is shown. Tool segment 28 of the example embodiment of FIG. 10 includes three layers; radially outer layer 36, radially inner layer 38, and middle layer 40. Middle layer 40 is located between radially outer layer 36 and radially inner layer 38. Radially outer layer 36, radially inner layer 38, and middle layer 40 can be integrally formed or can be three separate members that are secured to each other. Middle layer 40 is axially and circumferentially offset from both radially outer layer 36 and radially inner layer 38, defining end pocket 42 and end lip 44 opposite end pocket 42, and further defining side pocket 46 and side lip 48 opposite side pocket 46 (FIG. 8). End pocket 42 and side pocket 46 are cavities located between radially outer layer 36, radially inner layer 38. End lip 44 and side lip 48 are portions of middle layer 40 that extend past the outer edges of radially outer layer 36 and radially inner layer 38. In alternate embodiments, end pocket 42, side pocket 46, end lip 44, and side lip 48 can have alternate shapes, such as mating profiled sections.

Looking again at FIG. 2, in the contracted state, the plurality of moveable tool segments 34 are axially aligned with the plurality of stationary tool segments 32. As an example, one or more moveable tool segments 34 extend axially from each stationary tool segment 32 to form a segment set 50. In the example of FIG. 2, four segments sets 50 are shown, each segment set 50 having one stationary tool segment 32 and two moveable tool segments 34. Therefor the example of FIG. 2 includes twelve tool segments 28 in total. In alternate embodiments, each segment set 50 could include more or less tool segments 28 and there may be more or less than four segment sets 50, so long as in the final state, tool segments 28 can be oriented and aligned to form a generally cylindrical expandable tool 20 when expandable tool 20 is in a final state. However expandable tool 20 need not have a perfectly cylindrical final state, so long as expandable tool 20 is able to perform the downhole function for which it is intended. In other alternate embodiments, tool segments 28 can have shapes that vary between tool segments 28.

In the contracted state, end lip 44 of certain of the plurality of tool segments 28 is located within an end pocket 42 of an axially adjacent one of the plurality of tool segments 28. In the example of FIG. 2, end lip 44 of each of the stationary tool segments 32 are located within end pocket 42 of an axially adjacent moveable tool segment 34 and end lip 44 of such axially adjacent moveable tool segment 34 is located within end pocket 42 of an additional axially adjacent moveable tool segment 34. As can be best seen in FIG. 8, side lip 48 of each of the tool segments 28 is located outside of any side pocket 46 so although each segment set might contact each other, each segment set 50 is only secured to each other segment set 50 through legs 30.

Looking at FIGS. 1 and 8, in the contracted state, the outer diameter of expandable tool 20 is minimum outer diameter 52, which is less than smallest inner diameter 54 of tubing 16. In certain embodiments, smallest inner diameter 54 of tubing 16 can be an inner diameter that is reduced by tools, equipment, or other obstructions, so that expandable tool 20 can be lowered from the surface through tubing 16 to reach isolated region 18.

Figure 3:
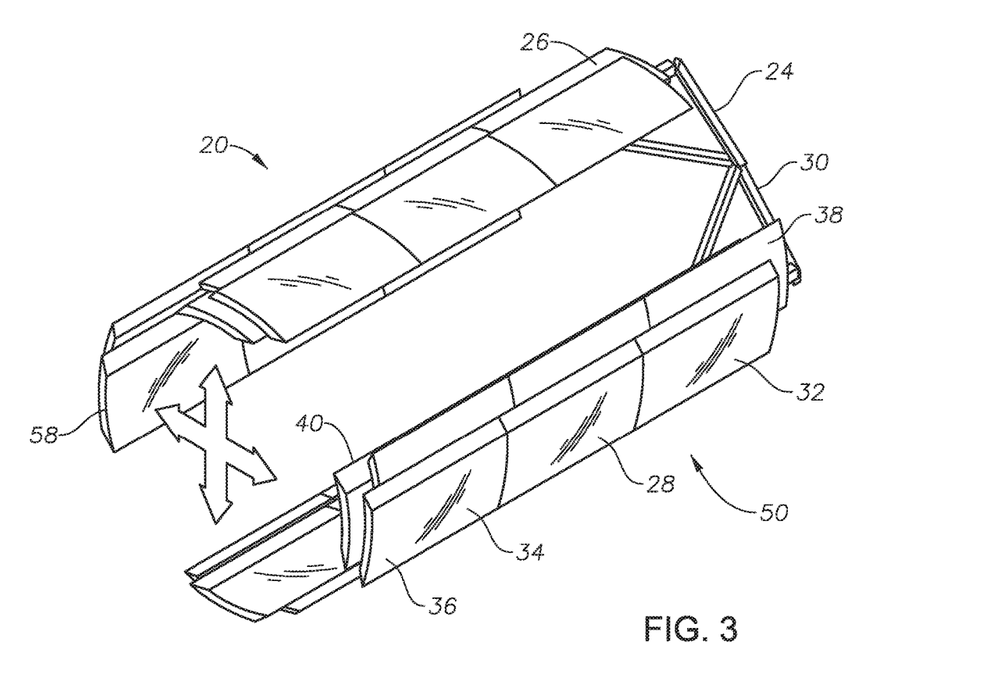
FIG. 3 is a perspective view of the expandable tool of FIG. 2, shown in an expanded state.

Turning now to FIG. 3, tool frame 24 can be moved to an expanded state. The outer diameter of expandable tool 20 is increased by moving each of the tool segments 28 radially outward, until expandable tool 20 is in the expanded state. Frame 24 can be used to expand expandable tool 20. Such expansion operation can, as an example, be hydraulically or electrically driven. Each leg 30 of tool frame 24 can move one of the segments sets 50 radially outward. The outer diameter of expandable tool 20 can be increased until the inner diameter of the expandable tool is a maximum inner diameter 56 (FIG. 9) that is at least as large as the minimum outer diameter 52 of expandable tool 20 when expandable tool 20 is in the contracted state. This will allow downhole operations to continue to take place through expandable tool 20, without expandable tool 20 further limiting the outer diameter of any other tool or tubular or equipment needed to perform such operations.

Figure 4:
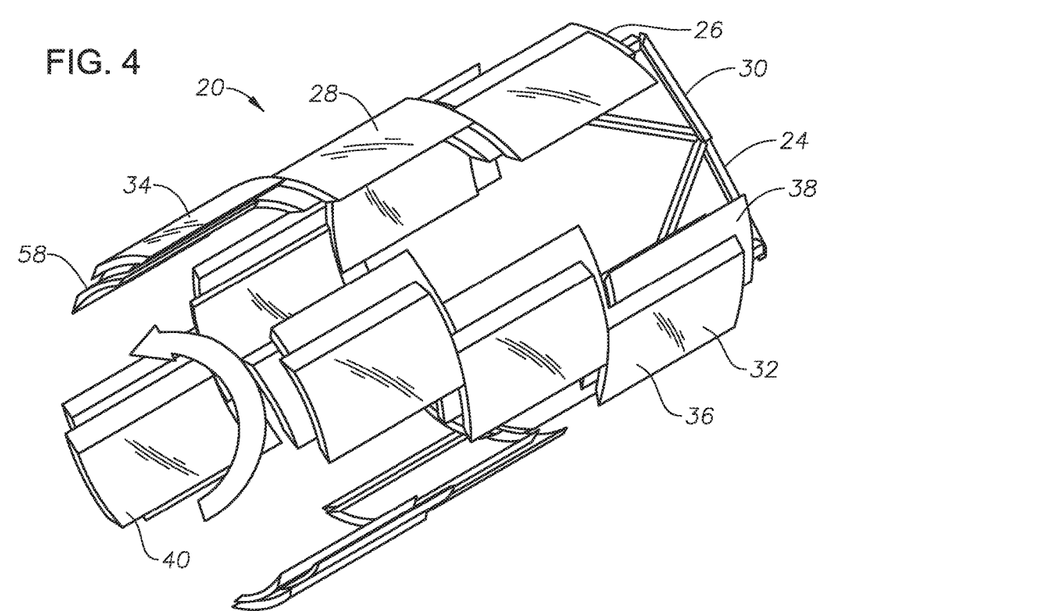
FIG. 4 is a perspective view of the expandable tool of FIG. 2, shown in the expanded state during a rotating operation.

Looking at FIG. 4, expandable tool 20 can be rotated so that the plurality of moveable tool segments 34 rotate relative to tool frame 24. The plurality of stationary tool segments 32 remain fixed relative to tool frame 24. The rotation operation can continue until expandable tool 20 is in a fully rotated state. Free end 58 of expandable tool 20 is opposite frame end 26 of expandable tool 20 and the rotation operation can take place by rotating free end 58 relative to tool frame 24. During the rotation operation, certain of the end lips 44 of tool segments 28 slide within an end pocket 42 of an axially adjacent one of the plurality of tool segments 28. In the example of FIG. 4, moveable tool segments 34 rotate 30 degrees with respect to axially adjacent tool segments 28. The rotation operation can, as an example, be hydraulically or electrically driven with a deployment tool.

Figure 5:
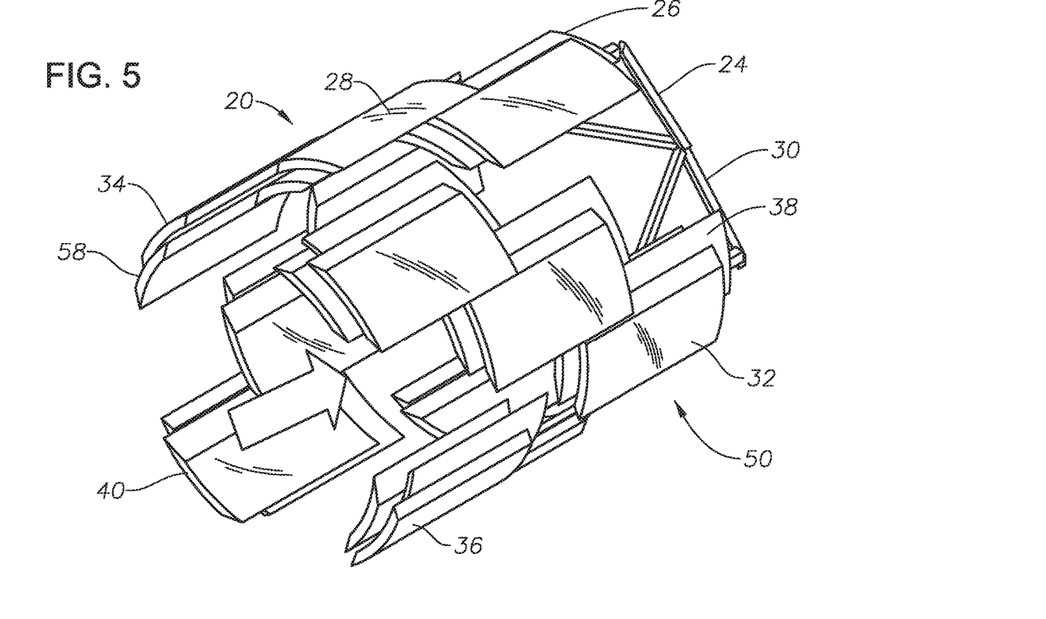
FIG. 5 is a perspective view of the expandable tool of FIG. 2, shown in a completely rotated state during an early portion of a compression operation.

Turning to FIG. 5, when expandable tool 20 has been fully rotated, the side lip 48 of certain of the tool segments 28 will align with a side pocket 46 of certain other tool segments. In the example of FIG. 5, side lip 48 of each stationary tool segment 32 aligns with side pocket 46 of an axially adjacent moveable tool segment 34 and side lip 48 of such axially adjacent moveable tool segment 34 aligns with side pocket 46 of an additional axially adjacent moveable tool segment 34. Side lip 48 of such additional axially adjacent moveable tool segment 34 will align with side pocket 46 of a circumferentially adjacent stationary tool segment 32.

Figure 6:
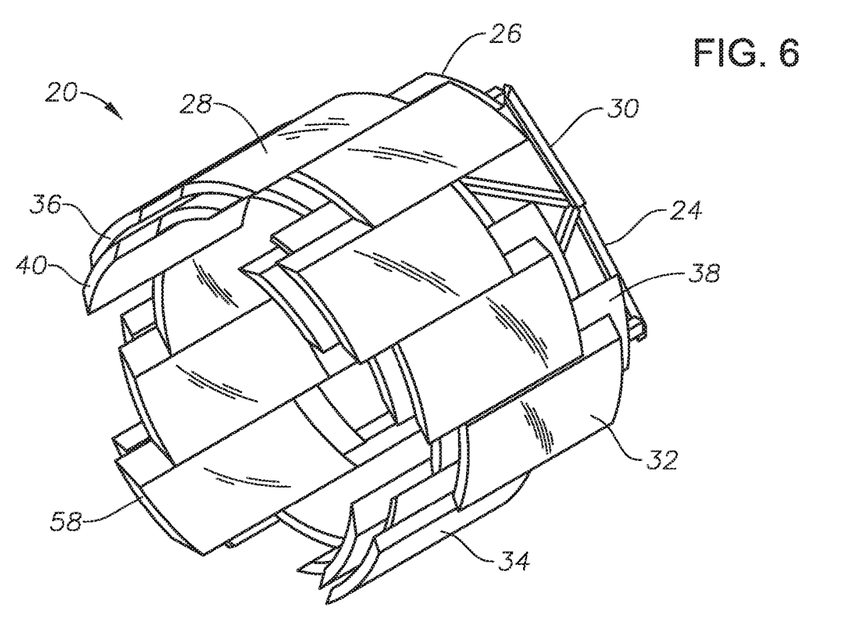
FIG. 6 is a perspective view of the expandable tool of FIG. 2, shown in a completely rotated state during a late portion of a compression operation.

Looking at FIGS. 5-6, an axial force can be applied to expandable tool 20 during a compression operation so that moveable tool segments 34 move axially relative to tool frame 24 and relative to stationary tool segments 32. During the compression operation, the axial length of expandable tool 20 is reduced until expandable tool 20 is in the final state. In the example of FIGS. 5-6, during the compression operation, side lip 48 of each of the plurality of tool segments 28 slides within a side pocket 46 of a circumferentially adjacent one of the plurality of tool segments 28. As expandable tool 20 is moved into the final state, tool segments 28 will sealingly engage circumferentially adjacent tool segments 28. As can best be seen in FIGS. 8-9, sides 60 of each tool segment 28 is tapered. This taper will assist in aligning side lips 48 with side pockets 46, and will also assist in forming a seal between adjacent tool segments 28. The compression operation can, as an example, be hydraulically or electrically driven with a deployment tool.

Figure 7:
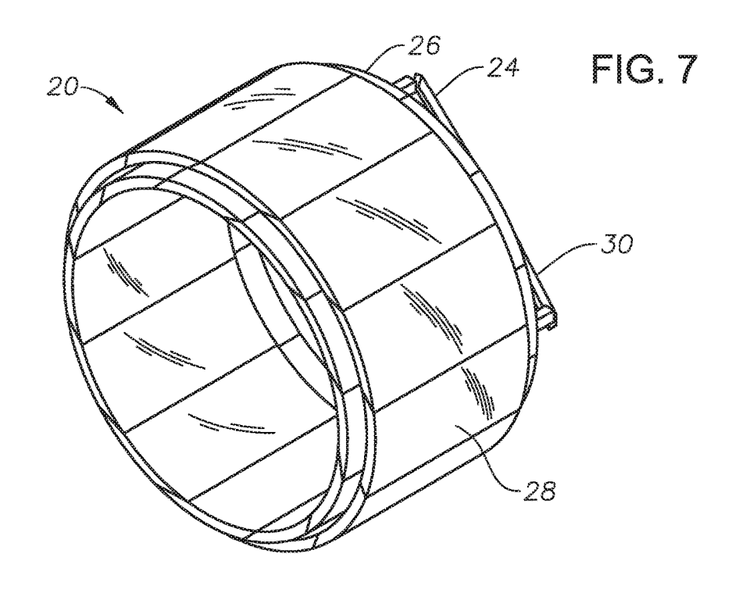
FIG. 7 is a perspective view of the expandable tool of FIG. 2, shown in a final state.

In the final state of FIG. 7, the plurality of moveable tool segments 34 are circumferentially aligned with the plurality of stationary tool segments 32 and maximum inner diameter 56 (FIG. 9) remains at least as large as the minimum outer diameter 52 of expandable tool 20 when expandable tool 20 is in the contracted state. Side lip 48 of each of the plurality of tool segments 28 remains located within a side pocket 46 of a circumferentially adjacent one of the plurality of tool segments 28. The interaction of the side lips 48 and side pockets 46 together with the tapered shape of the sides 60 of tool segments 28 will provide a seal between each tool segment 28. When expandable tool 20 is in the final state, frame 24 could be removed In an example of operation, looking at FIGS. 1-2, to deploy expandable tool 20 in subterranean well 10, expandable tool 20 can be lowered into subterranean well 10 on a wireline, e-line or coiled tubing. When expandable tool 20 is lowered into subterranean well 10, it will be in the contracted state. Turning to FIG. 3, when expandable tool 20 is at the desired final location within subterranean well 10, the outer diameter of expandable tool 20 can be increased by moving each of the tool segments 28 radially outward, until expandable tool 20 is in an expanded state. Expandable tool 20 can then be rotated so that the plurality of moveable tool segments 34 rotate relative to tool frame 24 and the plurality of stationary tool segments 32 remain fixed relative to tool frame 24, as shown in FIG. 4. Expandable tool 20 is rotated until expandable tool 20 is in a fully rotated state. Looking at FIGS. 5-6, an axial force is then applied to expandable tool 20 so that the moveable tool segments 34 move axially relative to tool frame 24 and the axial length of expandable tool 20 is reduced. The axial length of expandable tool 20 is reduced until expandable tool 20 is in the final state shown in FIG. 7.

In the final state, the outer diameter of expandable tool 20 is sufficient to engage the inner diameter of surface casing 14 and tool segments 28 will sealingly engage each other so that no fluids can pass between the axial bottom of expandable tool 20 to the axial top of expandable tool 20. In order to retrieve expandable tool 20, the operation can be reversed so that expandable tool 20 is returned to the contracted state and pulled up and out of the subterranean well 10.

Although expandable tool 20 has been described herein for use as a straddle packer, embodiments of expandable tool 20 described herein can alternately be used for other downhole applications where a tool is required to pass through a restricted diameter and then expand into a final position, such as, for example, downhole anchors, casing patches, sand control screens, reamers, brushes, and scrapers.

The systems and methods described herein, therefore, are well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure disclosed herein and the scope of the appended claims.

What is claimed is:

1. A method for deploying an expandable tool in a subterranean well, the method comprising:
   lowering the expandable tool in a contracted state into the subterranean well, the expandable tool including a tool frame located at a frame end of the expandable tool that is movable between a frame contracted position and a frame extended position, and a plurality of tool segments spaced around a central axis of the expandable tool, the plurality of tool segments including a plurality of moveable tool segments and a plurality of stationary tool segments;
   increasing an outer diameter of the expandable tool by moving the plurality of tool segments radially outward, and moving the tool frame from the frame contracted position to the frame extended position until the expandable tool is in an expanded state;
   rotating the expandable tool so that the plurality of moveable tool segments rotate relative to the tool frame and the plurality of stationary tool segments remain fixed relative to the tool frame, until the expandable tool is in a fully rotated state, wherein the plurality of moveable tool segments are axially misaligned with the plurality of stationary tool segments when in the fully rotated state; and
   applying an axial force to the expandable tool so that the plurality of moveable tool segments move axially relative to the tool frame and the plurality of stationary tool segments and an axial length of the expandable tool is reduced, until the expandable tool is in a final state wherein the plurality of moveable tool segments are circumferentially adjacent to the plurality of stationary tool segments when in the final state.

2. The method according to claim 1, wherein an inner diameter of the expandable tool in the final state is at least as large as the outer diameter of the expandable tool in the contracted state.

3. The method according to claim 1, wherein in the contracted state the plurality of moveable tool segments are axially aligned with the plurality of stationary tool segments.

4. The method according to claim 1, wherein in the final state the plurality of moveable tool segments are circumferentially aligned with the plurality of stationary tool segments.

5. The method according to claim 1, wherein each of the plurality of stationary tool segments are fastened to the tool frame and each of the plurality of moveable tool segments are moveably linked to at least one of the plurality of stationary tool segments.

6. The method according to claim 1, wherein each of the plurality of moveable tool segments includes:
   a radially outer layer;
   a radially inner layer; and
   a middle layer located between the radially outer layer and the radially inner layer, the middle layer being axially and circumferentially offset from each of the radially outer layer and the radially inner layer, defining an end pocket and an end lip opposite the end pocket, and further defining a side pocket and a side lip opposite the side pocket.

7. The method according to claim 6, wherein in the final state, the side lip of each of the plurality of tool segments is located within the side pocket of a circumferentially adjacent one of the plurality of tool segments.

8. The method according to claim 6, wherein the step of applying the axial force to the expandable tool includes sliding the side lip of each of the plurality of tool segments within the side pocket of a circumferentially adjacent one of the plurality of tool segments.

9. The method according to claim 6, wherein in the contracted state, the end lip of certain of the plurality of tool segments is located within the end pocket of an axially adjacent one of the plurality of tool segments.

10. The method according to claim 6, wherein the step of rotating the expandable tool includes sliding the end lip of certain of the plurality of tool segments within the end pocket of an axially adjacent one of the plurality of tool segments.

11. The method according to claim 1, wherein the step of applying the axial force to the expandable tool includes sealingly engaging each of the plurality of tool segments with a circumferentially adjacent one of the plurality of tool segments.

12. A method for deploying an expandable tool in a subterranean well, the method comprising:
   lowering the expandable tool in a contracted state into the subterranean well, the expandable tool including a tool frame located at a frame end of the expandable tool that is movable between a frame contracted position and a frame extended position, and a plurality of tool segments spaced around a central axis of the expandable tool, the plurality of tool segments including a plurality of moveable tool segments and a plurality of stationary tool segments that are fixed to the tool frame;
   increasing an outer diameter of the expandable tool by moving a plurality of segments sets radially outward and moving the tool frame from the frame contracted position to the frame extended position, until the expandable tool is in an expanded state, each of the plurality of segment sets including at least one of the plurality of moveable tool segments and one of the plurality of stationary tool segments;
   rotating the expandable tool so that the at least one of the plurality of moveable tool segments of each of the plurality of segment sets rotates relative to the one of the plurality of stationary tool segments of the respective one of the plurality of segment sets, until the expandable tool is in a fully rotated state, wherein the plurality of moveable tool segments are axially misaligned with the plurality of stationary tool segments when in the fully rotated state; and
   applying an axial force to the expandable tool so that the plurality of moveable tool segments move axially relative to the tool frame and the plurality of stationary tool segments and an axial length of the expandable tool is reduced, until the expandable tool is in a final state, wherein the plurality of moveable tool segments are circumferentially adjacent to the plurality of stationary tool segments when in the final state.

13. The method according to claim 12, wherein the step of increasing the outer diameter of the expandable tool includes increasing the outer diameter of the expandable tool until an inner diameter of the expandable tool in the final state is at least as large as the outer diameter of the expandable tool in the contracted state.

14. The method according to claim 12, wherein the step of applying the axial force to the expandable tool includes sealingly engaging each of the plurality of tool segments with a circumferentially adjacent one of the plurality of tool segments.

15. The method according to claim 12, wherein when the expandable tool is in the contracted state the at least one of the plurality of moveable tool segments of each of the plurality of segment sets is axially aligned with the one of the plurality of stationary tool segments of the respective one of the plurality of segment sets, and wherein when the expandable tool is in the final state, the at least one of the plurality of moveable tool segments of each of the plurality of segment sets is circumferentially aligned with the one of the plurality of stationary tool segments of the respective one of the plurality of segment sets.

16. An expandable tool for use in a subterranean well, the expandable tool comprising:
  a tool frame located at a frame end of the expandable tool that is movable between a frame contracted position and a frame extended position;
  a plurality of tool segments spaced around a central axis of the expandable tool, the plurality of tool segments including a plurality of moveable tool segments and a plurality of stationary tool segments, the plurality of tool segments being moveable between a contracted state and an expanded state, and the plurality of moveable tool segments being moveably between a fully rotated state, and a final state, wherein the expandable tool is configured to be lowered into the subterranean well in the contracted state, and wherein an outer diameter of the expandable tool is configured to be increased by moving the plurality of tool segments radially outward and moving the tool frame from the frame contracted position to the frame extended position, until the expandable tool is in the expanded state; and
  a free end opposite the frame end of the expandable tool, the free end being rotatable relative to the tool frame to rotate the plurality of moveable tool segments relative to the tool frame until the expandable tool is in the fully rotated state while the plurality of stationary tool segments remain fixed relative to the tool frame wherein the plurality of moveable tool segments are axially misaligned with the plurality of stationary tool segments when in the fully rotated state, the free end further being moveable in response to an axial force to move the plurality of moveable tool segments axially relative to the tool frame and the plurality of stationary tool segments until the expandable tool is in the final state, wherein the plurality of moveable tool segments are circumferentially adjacent to the plurality of stationary tool segments when in the final state.

17. The expandable tool according to claim 16, wherein an inner diameter of the expandable tool in the final state is at least as large as the outer diameter of the expandable tool in the contracted state.

18. The expandable tool according to claim 16, wherein in the contracted state the plurality of moveable tool segments are axially aligned with the plurality of stationary tool segments.

19. The expandable tool according to claim 16, wherein in the final state the plurality of moveable tool segments are circumferentially aligned with the plurality of stationary tool segments.

20. The expandable tool according to claim 16, wherein each of the plurality of moveable tool segments are moveably linked to at least one of the plurality of stationary tool segments.

* * * * *